(12) United States Patent
Kuntawar

(10) Patent No.: US 9,652,292 B2
(45) Date of Patent: May 16, 2017

(54) SYSTEM AND METHOD FOR BUSINESS PROCESS GATEWAY TOKEN FLOW

(75) Inventor: Yorgeshwar Wamanrao Kuntawar, Union City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 927 days.

(21) Appl. No.: 13/197,660

(22) Filed: Aug. 3, 2011

(65) Prior Publication Data

US 2013/0036176 A1 Feb. 7, 2013

(51) Int. Cl.
*G06F 9/50* (2006.01)

(52) U.S. Cl.
CPC .................................. *G06F 9/5038* (2013.01)

(58) Field of Classification Search
CPC ........................................................ G06F 9/50
See application file for complete search history.

(56) References Cited

U.S. PATENT DOCUMENTS

| | | | | |
|---|---|---|---|---|
| 8,429,653 | B2* | 4/2013 | Barros et al. | 718/100 |
| 2007/0268922 | A1* | 11/2007 | Dougan et al. | 370/401 |
| 2008/0301419 | A1* | 12/2008 | Barros et al. | 712/233 |
| 2008/0312992 | A1* | 12/2008 | Hoshi et al. | 705/7 |
| 2011/0145125 | A1* | 6/2011 | Foygel et al. | 705/37 |
| 2011/0145518 | A1* | 6/2011 | Balko et al. | 711/154 |

* cited by examiner

*Primary Examiner* — Kurtis Gills
(74) *Attorney, Agent, or Firm* — Tucker Ellis LLP

(57) ABSTRACT

Systems and methods are provided, for use in a messaging subsystem, which manages gateway flow. A system for use in a messaging subsystem, which manages gateway flow, can comprise a computer, including a computer readable medium and processor. The system can also comprise a business process, stored on the computer, wherein the business process includes a plurality of gateways; and a plurality of counters, each associated with a different gateway, wherein each counter indicates how many tokens are required for the associated gateway to activate. The system can statically analyze the business process to identify each of the plurality of gateways, determine, at runtime, for each gateway whether to decrement the counter associated with a subsequent gateway, and decrement the counter associated with the subsequent gateway to manages gateway flow.

18 Claims, 13 Drawing Sheets

```
public int getNumberOfFlows(Iscope scope, Gateway gateway, String activationId){
    Integer noOfFlows = scope.lookup(gateway.getId() + "-" + activationId);
    if(NoOfFlows == null){
        noOfFlows == gateway.getIncommingFlows().size();
    }
    return noOfFlows;
}
```

```
public void decrementFlowCount(Iscope scope, Gateway gateway, String seqFlowId,
    String activationId){

1002 if(gateway.isMergingGateway()) return;

1004 Gateway nextGateway = gateway.nextGateway(seqFlowId);
1006 int flows = getNumberOfFlows(scope,nextGateway,activationId);

1008 if(nextGateway == parallel || flows == 1)
    {
        List outGoingFlows = nextGateway.getOutgoingFlows();
1010    for(int I = 0 ; I < outGoingFlows.size (); I++)
        {
            decrementFlowCount(scope,nextGateway,outGoingFlows.get(i),activationId);
        }
1012 }else{
        flows = flows-1;
        scope.put(nextGateway.getId() + "-" + activationId, flows)
    }
}
```

```
public Boolean canActivate(Iscope scope, Icontext ctx){
    return TokenManager.containsToken(node.getNodeId());
}
                                                          1100
```

FIGURE 11

```
    public Boolean canActivate(Iscope scope , Icontext ctx)
    {
1202  Queue queue = TokenManger.fetch(node.getNodeId());
1204  Map map = new HashMap();
      for(int I = 0 ; < queue.size(); I++)
      {
         activationId = queue.get(i);
         List tokens = (List)map.get(activationId);
         if(tokens == null)
         {
           tokens = new ArrayList();
         }
         tokens.add(queue.get(i));
         map.put(actovationId,tokens);
      }

1206  Iterator iter = map.keys()iterator();
      while(iter.hasNext()){
        String activationId = iter.next();
        List tokens = map.get(activationId);

int noOfFlows = getNumberOfFlows(scope,this,activationId);
        if(noOfFlows == tokens.size()){
           removeTokensFromQueue(activationId,queue);
           return true;
        }
      }
      return false;
    }
                                                          1200
```

FIGURE 12

```
public void finalize(Iscope scope, Icontext context){
    int activationId = scope.get(this.getNodeId() + scope.getId());
    TokenManager.generateToken(scope,context,node.nextActivity(),activationId);
}
```
1300

FIGURE 13

```
       public void finalize(Iscope scope, Icontext context){
1402   Gateway gateway = this.getStartGateway();
       Integer activationId = null;
       if(gateway.equals(this))
       {
         activationId = Util.getUniqueActovationId();
       }
1404   else if(!this.equals(this.getEndGateway()))
       {
         activationId =
             scope.get(this.getNodeId() + scope.getId());
       }
1406   for(int I = 0 ; I < this.getOutgoingFlows(); I++)
       {
         String activityId = outGoingFlows.get(i).getId();
         TokenManager.generateToken(scope,context,
             activityId ,activationId);

```
    public void executeStatement(IworkItem item, Iscope scope, Icontext context){
        List outgoingFlows = getCubeNode.getOutGoingFlows();
        Gateway gateway = getCubeNode.getStartGateway();
        Integer activationId = null;
1502    if(gateway.equals(this))
        {
          activationId = Util.getUniqueActovationId();
        }
1504    else if(!this.equals(this.getEndGateway())
        {
          activationId =
               scope.get(this.getNodeId() + scope.gettId());
        }

1506    for(int I = 0 ; I< outgoingFlows.size(); I++)
        {
            SequenceFlow flow = outgoingFlows.get(i);
            Boolean evaluation = Util.evaulateExpression(flow);
            if(evaluation)
            {
             TokenManager.generateToken(scope,context,
                        flow.getActivtyId(),activationId)
            }else{
                decrementFlowCount(scope, this, flow.getId(),activationId){
            }
        }
    }
```

SYSTEM AND METHOD FOR BUSINESS PROCESS GATEWAY TOKEN FLOW

COPYRIGHT NOTICE

A portion of the disclosure of this patent document contains material which is subject to copyright protection. The copyright owner has no objection to the facsimile reproduction by anyone of the patent document or the patent disclosure, as it appears in the patent and Trademark Office patent file or records, but otherwise reserves all copyright rights whatsoever.

FIELD OF INVENTION

The present invention is generally related to business process management (BPM) systems, and is particularly related to systems and methods for BPM gateway token flow without strict gateway flow.

BACKGROUND

Business processes, which may also be referred to as business flows or workflows, provide a level of abstraction above programming languages such as Java or C++, making them easier for non-programmers to use to describe desired processing within a particular business process. An example language used to define business processes is the Business Process Execution Language (BPEL), which is an XML-based executable language for specifying orchestration between web services that comprise a business process.

Business Process Modeling Notation (BPMN) is a standard graphical notation, resembling a flow chart, which can be used to model business processes. BPMN has three main types of elements, which are each represented by different shapes. An activity, represented graphically as a rectangle, represents some kind of work or action taking place in the business process. An event, represented graphically as a circle, represents external actions such as receiving or requesting information from an external entity or process. A gateway, represented graphically as a diamond, represents the beginning or end of a parallel branch, such as a decision point or a merging point, i.e., a gateway can be used to branch an incoming flow into multiple parallel flows or merge multiple parallel flows into a single outgoing flow. Gateways can include parallel forking (AND), inclusive (OR), and exclusive (XOR) gateways. Parallel forking gateways can take multiple paths or merge multiple paths; all paths will be taken or merged. Inclusive and exclusive gateways are referred to as conditional gateways. In inclusive gateways, one or more paths can be taken or merged. In exclusive gateways, only one path will be taken or merged.

Tokens can be used when executing a business process to control the flow from one activity to another. This way, an activity can be made to wait to execute until the previous activity or activities have completed, preventing activities from executing out of order. Tokens are passed between activities, so when an activity completes, it forwards the token on to the next activity, which can then execute. Typically, a gateway generates tokens to forward along each of the parallel flows to enable activities in those parallel flows to execute. Similarly, a merging gateway will wait until it has received tokens from each of the expected incoming flows, indicating that the activities in those flows have completed, before proceeding so that the process can continue properly without hanging. However, even when properly executing, some flows will not complete, and therefore no token will be forwarded to the merging gateway, which can also cause a process to hang. For example, an exclusive gateway will only take one path, so any activities waiting on the path not taken could get hung up.

This is the general environment in which embodiments of the invention are intended to be used.

SUMMARY

Systems and methods are provided, for use in a messaging subsystem, which manages gateway flow. A system for use in a messaging subsystem, which manages gateway flow, can comprise a computer, including a computer readable medium and processor. The system can also comprise a business process, stored on the computer, wherein the business process includes a plurality of gateways; and a plurality of counters, each associated with a different gateway, wherein each counter indicates how many tokens are required for the associated gateway to activate. The system can statically analyze the business process to identify each of the plurality of gateways, determine, at runtime, for each gateway whether to decrement the counter associated with a subsequent gateway, and decrement the counter associated with the subsequent gateway.

BRIEF DESCRIPTION OF THE FIGURES

FIG. 9 shows a pseudocode listing of a method used to determine a number of flows required by a gateway, in accordance with an embodiment.

FIG. 10 shows a pseudocode listing of a method that decrements a counter, in accordance with an embodiment.

FIG. 11 shows a pseudocode listing of method for determining whether an activity or an exclusive gateway can activate, in accordance with an embodiment.

FIG. 12 shows a pseudocode listing of a method that can be used to dynamically adjust the batch size used by a producer, in accordance with an embodiment.

FIG. 13 shows a pseudocode listing of a method for activities other than gateways to generate tokens, in accordance with an embodiment.

FIG. 14 shows a pseudocode listing of a method for parallel gateways to generate tokens, in accordance with an embodiment.

FIG. 15 shows a pseudocode listing of a method for exclusive and inclusive gateways to generate tokens, in accordance with an embodiment.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Figure 1:
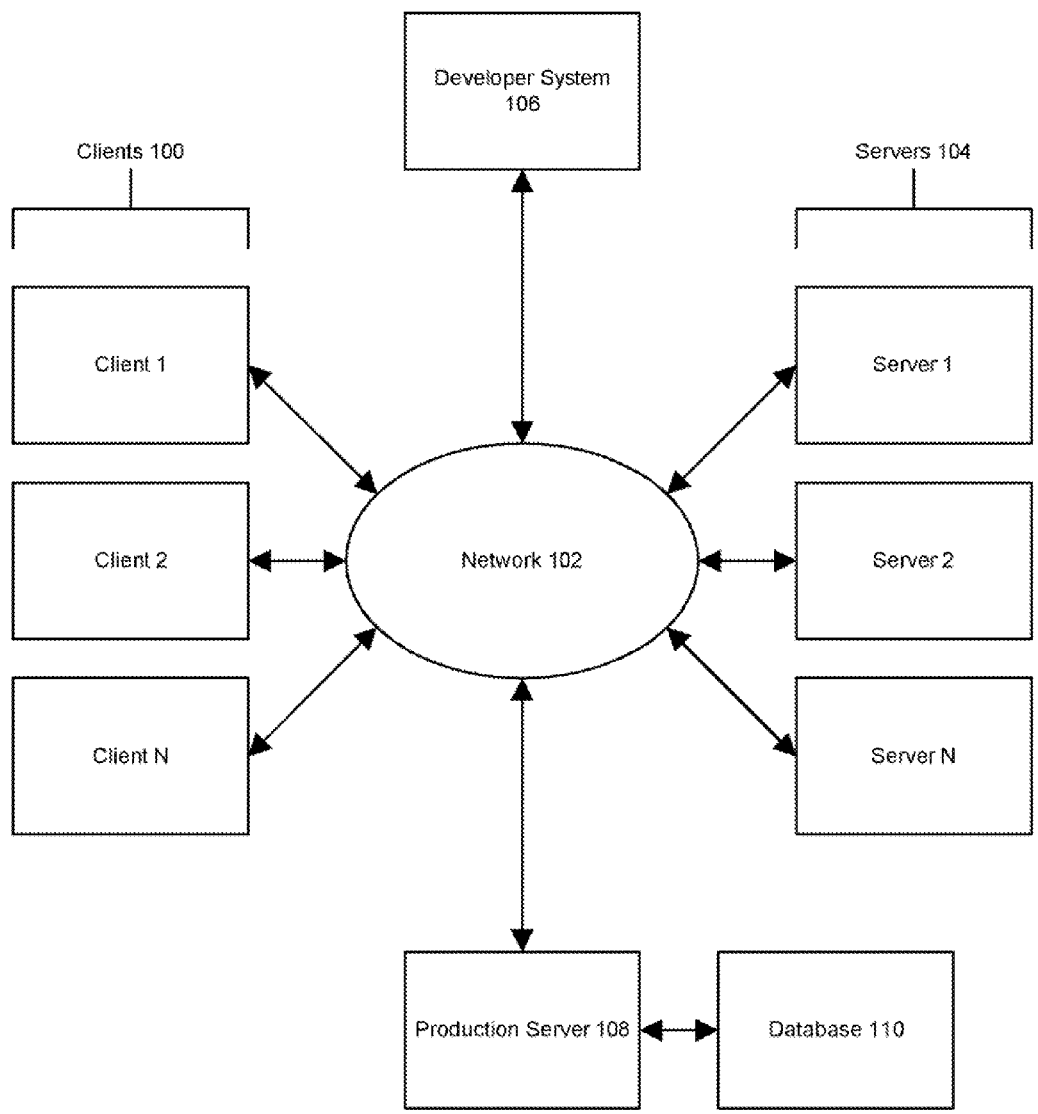
FIG. 1 shows an illustration of a typical networked computing environment.

FIG. 1 shows an illustration of a typical networked computing environment. As shown in FIG. 1, a typical networked computing environment can include a plurality of clients 100, such as Client 1, Client 2, and Client N connected to a network 102, such as the Internet. The clients can be, for example, personal computers, workstations, mobile computing devices, or any other networkable device. Also connected to the network are a plurality of servers 104 such as Server 1, Server 2, and Server N. These servers can include application servers and web servers which provide services in response to requests that are received over the network from the clients or other servers or services. A developer system 106 can provide a software developer with access to the network to create, modify, and/or deploy business processes, which can then be utilized by the plurality of clients. The developer can deploy the business processes to a production server 108, which is typically a computer server system that stores and executes the business processes. The production server can access additional business processes stored in a database 110. The production server can receive service requests from the plurality of clients, or the plurality of servers, and execute an appropriate business process. Execution of the appropriate business process can include invoking one or more web services offered by the plurality of servers.

Figure 2:
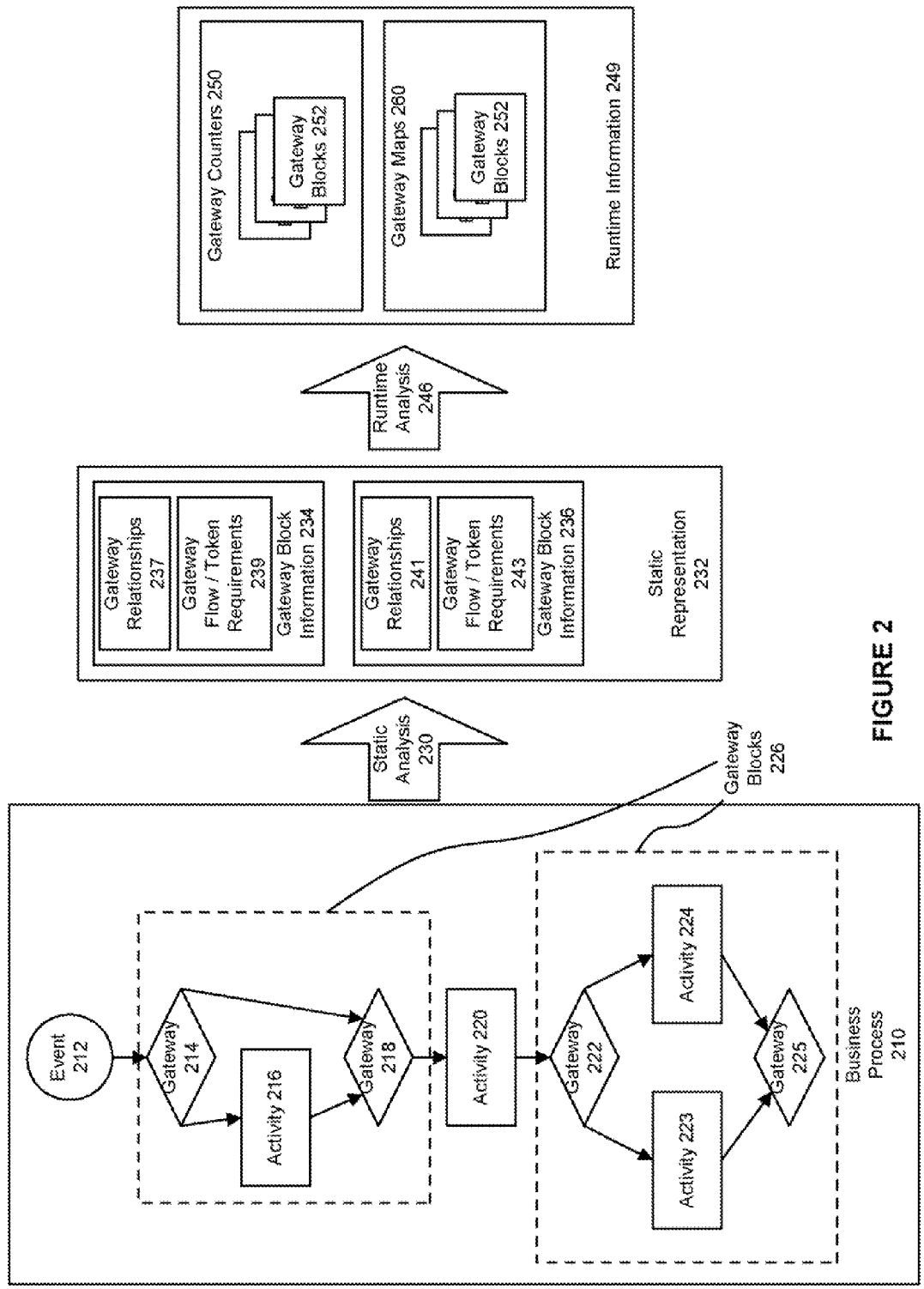
FIG. 2 shows a block diagram of a system that analyzes business processes, in accordance with an embodiment.

FIG. 2 shows a block diagram of a system that analyzes business processes, in accordance with an embodiment. As illustrated by way of example, a business process 210 can comprise a plurality of elements, including events (212), gateways (214, 218, 222 and 225) and activities (216, 220, 223 and 224). Gateways represent decision and/or branching points and can occur in gateway blocks 226. As referred to herein, a gateway block is a portion of a business process which is bounded by two gateways, referred to as a start gateway and an end gateway, and can also include one or more gateways and other elements. At runtime, processing through each gateway block will proceed according to the types of gateways present.

To help anticipate how a business process will execute, a static analysis 230 of the business process can be performed to generate a static representation 232 which includes information about the business process. The static analysis of a business process can determine gateway blocks information (234, 236) for each gateway block in the business process. This information can include gateway relationships (237, 241), i.e., start/end gateways, and the next gateway relative to any particular gateway. The gateway block information can also include the type of each gateway (AND, OR, or XOR) and determine how many tokens each gateway expects to receive prior to activation (239, 243). By statically determining the relationships between different gateways in a particular business process, the system can ensure that the business process executes correctly.

In accordance with an embodiment, runtime analysis 246 can be performed based on the static representation to obtain runtime information 249 for the business process. The runtime information can be used during execution of the business process to smooth execution and help prevent the process from hanging or otherwise failing. The runtime information can include gateway counters 250 and gateway maps 260 for each gateway block 252 in the business process. Each gateway counter can be associated with a different gateway in the gateway block, and the initial value of the gateway counter can correspond to the number of tokens its associated gateway requires before it will activate during execution. The gateway counters can be populated initially using the gateway flow/token requirements which were determined in the static analysis. Each gateway map embodies the relationships between the gateways in each gateway block and can be constructed based on the gateway information determined during the static analysis.

Figure 3:
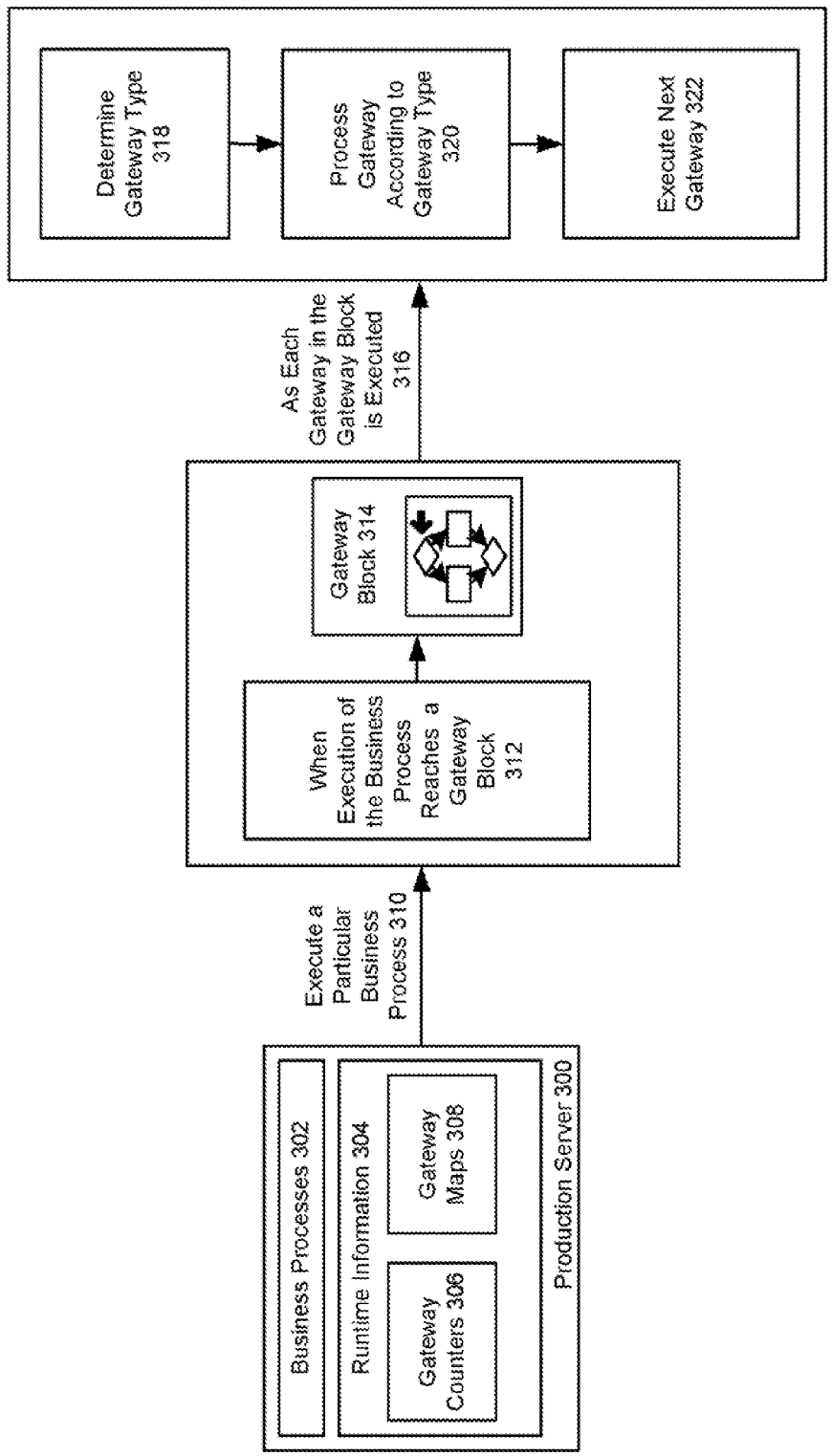
FIG. 3 shows a block diagram of a system that manages gateway token flow, in accordance with an embodiment.

FIG. 3 shows a block diagram of a system that manages gateway token flow, in accordance with an embodiment. As shown in FIG. 3, a production server 300 can have one or more business processes 302 stored thereon. Additionally, the production server can include runtime information 304, associated with each of the business processes, which was determined based on a static analysis of the one or more business processes, as described above with respect to FIG. 2. As described above, the runtime information can include gateway counters 306 and gateway maps 308. At 310, a particular business process stored on the production server is executed. Execution of the business process will proceed until a gateway block is reached 312. The gateway block 314 has gateway counters and a gateway map associated with it, which were generated during static analysis of the business process.

At 316, execution of the business process continues with the start gateway of the gateway block, using the runtime information associated therewith. The system determines the gateway type 318, and using the runtime information, processes the gateway according to its gateway type 320. This processing step can include updating the runtime information of subsequent gateways, depending on how the start gateway has executed. For example, the gateway counter for the next gateway may be decremented, if one or more tokens will not be forthcoming.

Execution of the business process continues until the next gateway in the gateway block is reached whereupon the next gateway is executed 322, and the process repeats until all gateway blocks have completed.

Figure 4:
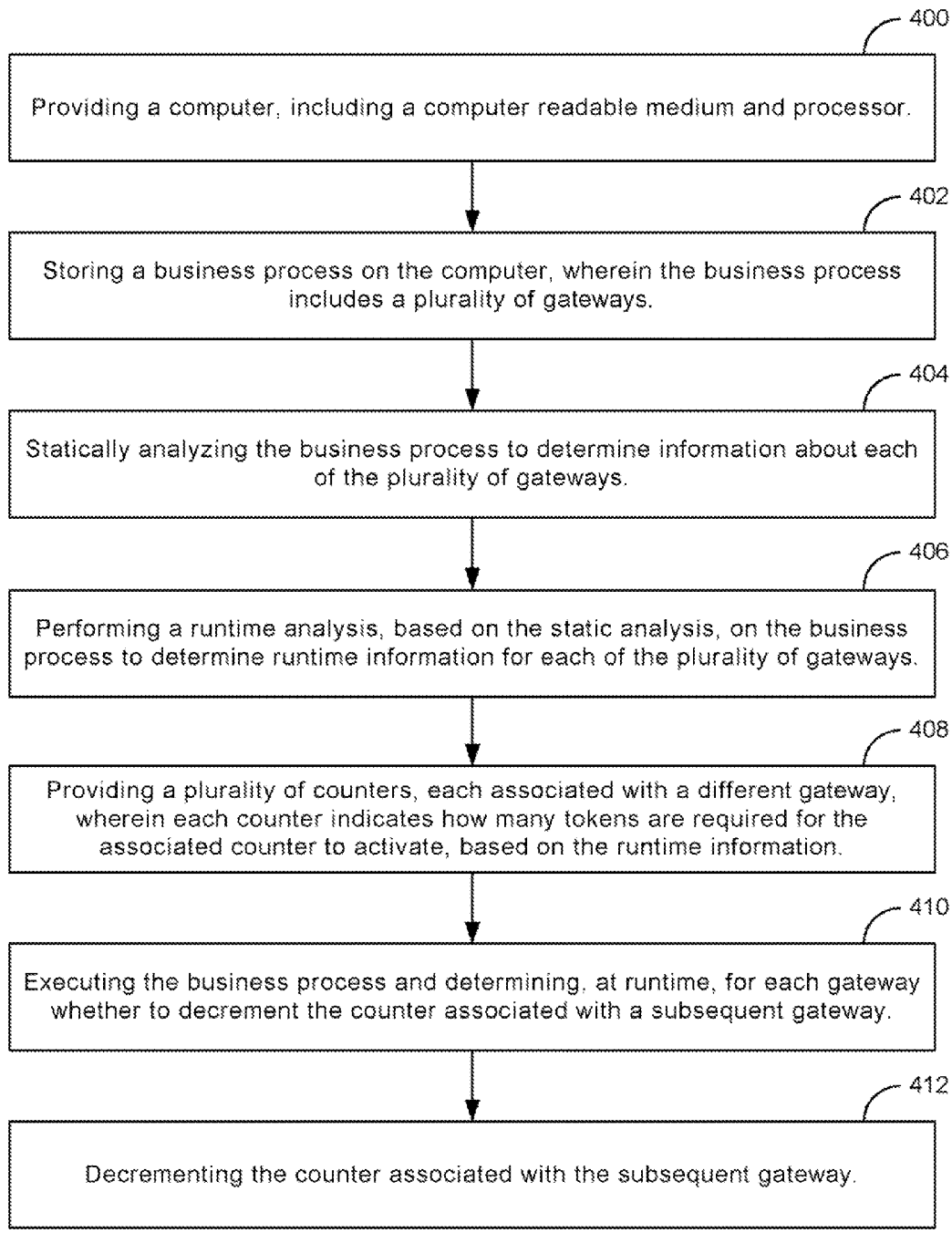
FIG. 4 shows a flowchart of a method for gateway token flow in a messaging subsystem, in accordance with an embodiment.

FIG. 4 shows a flowchart of a method for gateway token flow in a messaging subsystem, in accordance with an embodiment. At step 400, a computer, including a computer readable medium and processor is provided. At step 402, a business process is stored on the computer, wherein the business process includes a plurality of gateways. At step 404, the business process is statically analyzed to identify information about each of the plurality of gateways. At step 406, before the business process is executed, a runtime analysis is performed, based on the static analysis, to determine runtime information for each of the plurality of gateways. At step 408, a plurality of counters are provided, each associated with a different gateway. Each counter indicates how many tokens are expected to be received by the associated gateway and/or required for the associated gateway to activate, and each counter can be generated based on the runtime information. At step 410, the business process is executed, and at runtime it is determined for each gateway whether to decrement the counter associated with a subsequent gateway. At step 412, the counter associated with the subsequent gateway is decremented.

Figure 5:
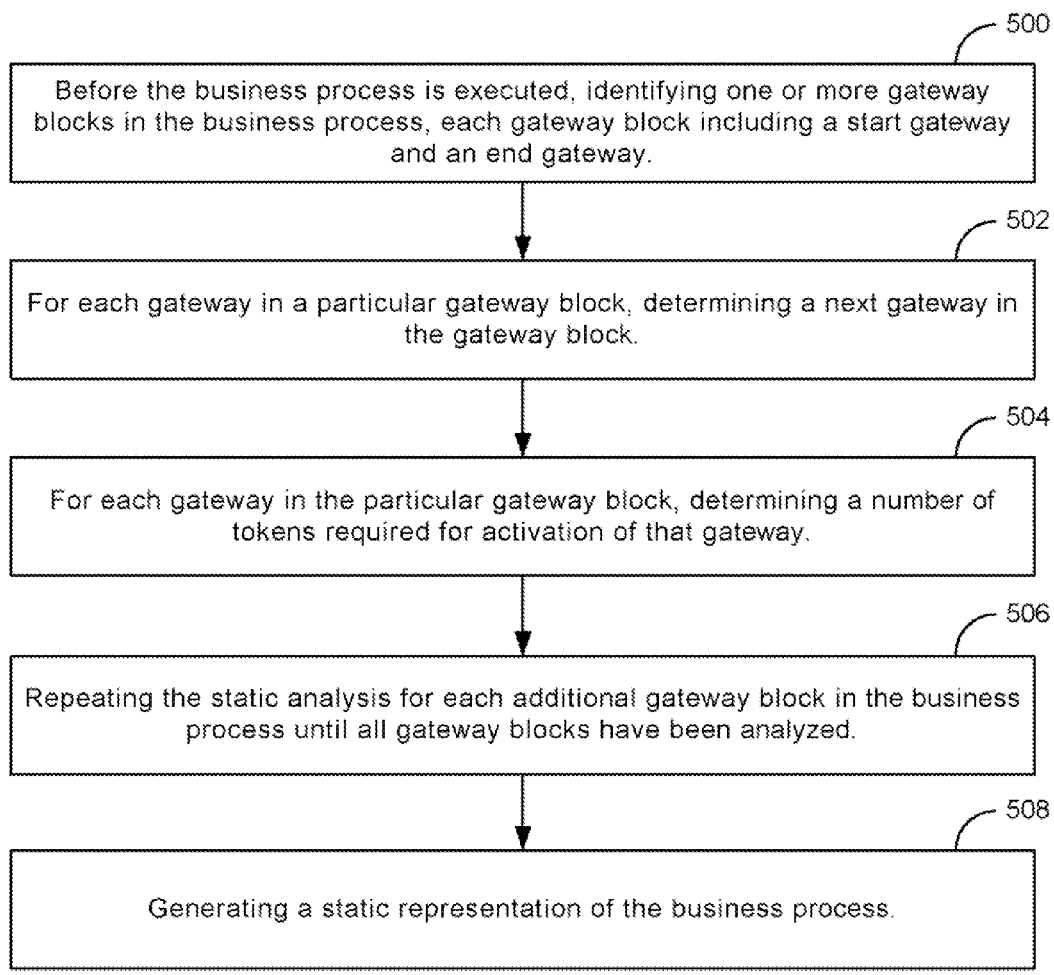
FIG. 5 shows a flowchart of a static analysis method, in accordance with an embodiment.

FIG. 5 shows a flowchart of a static analysis method, in accordance with an embodiment. At step 500, before the business process is executed, one or more gateway blocks can be identified in the business process, each gateway block including a start gateway and an end gateway. At step 502, for each gateway in a particular gateway block, a next gateway in the gateway block can be determined. At step 504, for each gateway in the particular gateway block, a number of tokens required for activation of that gateway is determined. At step 506, the static analysis is repeated for each additional gateway block in the business process until all gateway blocks have been analyzed. At step 508, a static representation of the business process is generated. The static representation includes information for each gateway block, including gateway relationship information (i.e., which gateway is the next gateway relative to a given gateway), and gateway flow/token requirements for each gateway (i.e., how many tokens are required by a given gateway for that gateway to activate, and/or how many tokens the given gateway can possibly receive).

Figure 6:
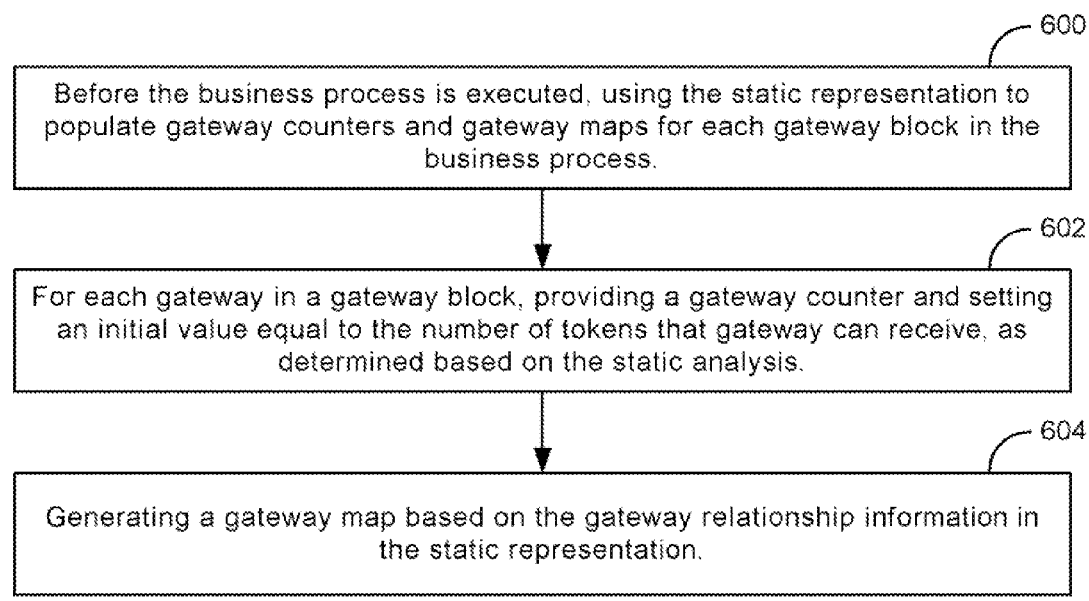
FIG. 6 shows a flowchart of a runtime analysis method, in accordance with an embodiment.

FIG. 6 shows a flowchart of a runtime analysis method, in accordance with an embodiment. At step 600, before the business process is executed, the static representation is used to populate gateway counters and gateway maps for each gateway block in the business process. At step 602, for each gateway in a gateway block, a gateway counter is provided and given an initial value equal to the number of tokens that gateway can receive and/or the number of tokens required by that gateway to activate, as determined based on the static analysis. At step 604, a gateway map is generated based on the gateway relationship information in the static representation. The gateway map can be used to identify the next gateway, and the gateway type, relative to a given gateway.

Figure 7:
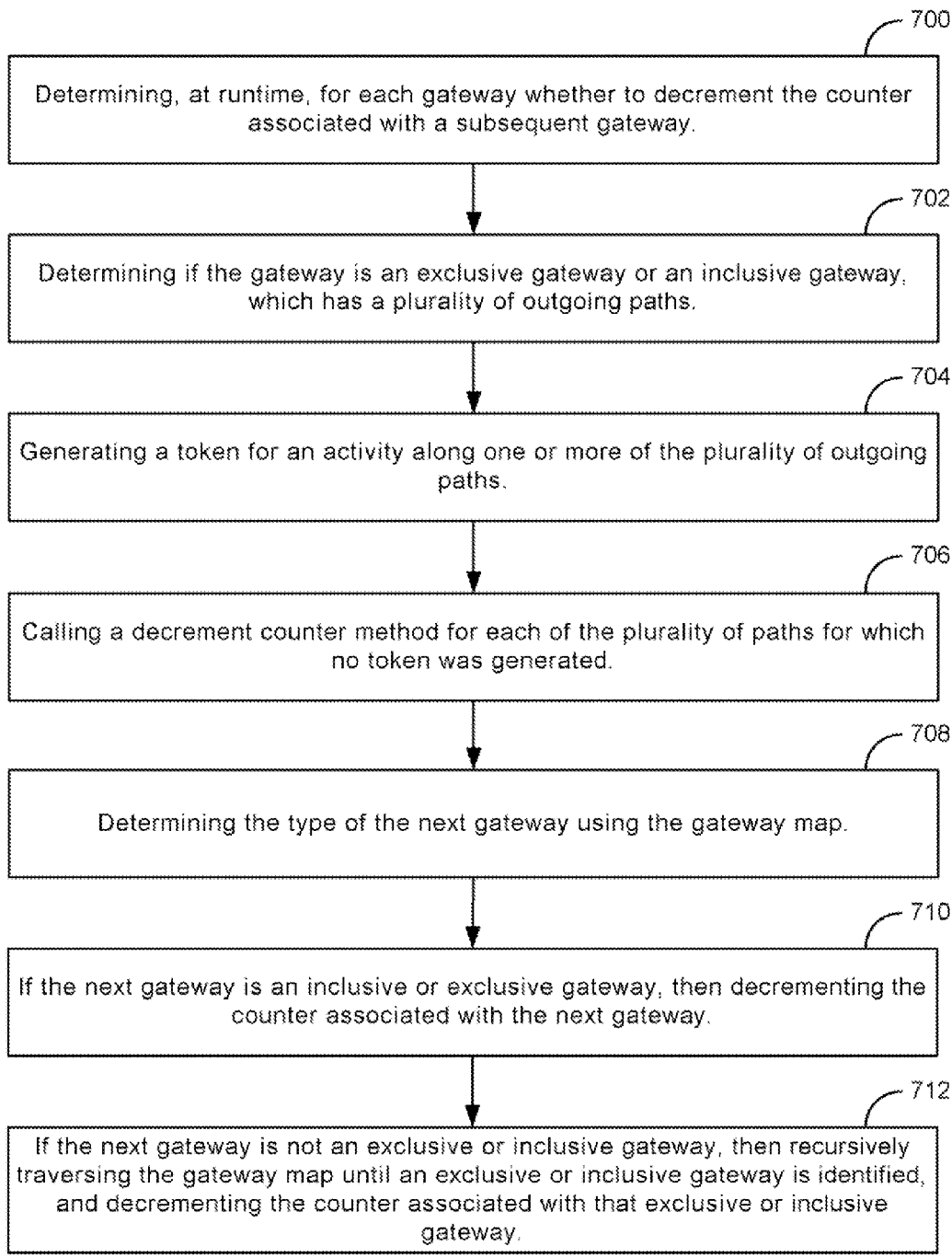
FIG. 7 shows a flowchart of a method of executing a business process, in accordance with an embodiment.

FIG. 7 shows a flowchart of a method of executing a business process, in accordance with an embodiment. At step 700, it is determined, at runtime, for each gateway whether to decrement the counter associated with a subsequent gateway. At step 702, it is determined if the gateway is an exclusive gateway or an inclusive gateway, which has a plurality of outgoing paths. At step 704, a token is generated for an activity along one or more of the plurality of outgoing paths. At step 706, a decrement counter method is called for each of the plurality of paths for which no token was generated. At step 708, the type of the next gateway is determined using the gateway map. At 710, if the next gateway is an inclusive or exclusive gateway, then the counter associated with the next gateway is decremented. At step 712, if the next gateway is not an exclusive or inclusive gateway, then the gateway map is recursively traversed until an exclusive or inclusive gateway is identified, whereupon the counter associated with that exclusive or inclusive gateway is decremented.

Static Analysis of an Exemplary Business Process

Figure 8:
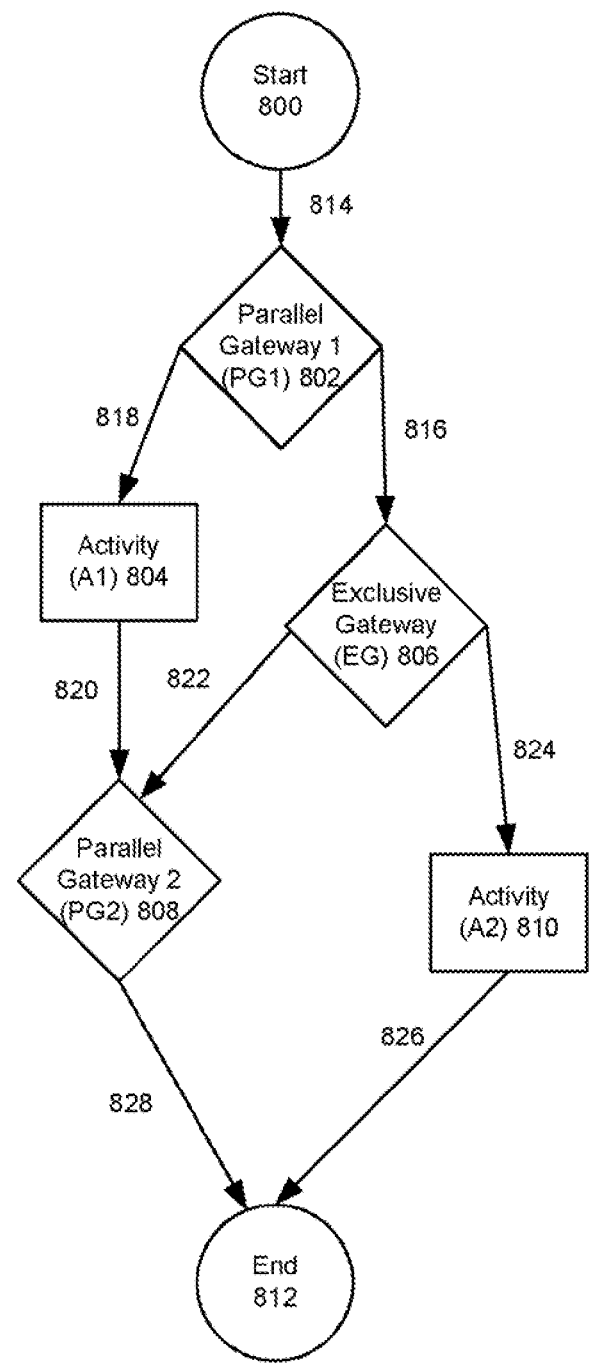
FIG. 8 shows an exemplary business process, in accordance with an embodiment.

FIG. 8 shows an exemplary business process, in accordance with an embodiment. As shown in FIG. 8, the business process illustrated therein begins with a start event 800. Processing continues along path 814 to parallel gateway 1 (PG8), 802, from which processing forks into two paths, a first path 816 to exclusive gateway 1 (EG1) 806 and a second path 818 to Activity 1 (A1) 804. PG1 is an inclusive (AND) gateway, so processing proceeds along both paths. As such, two tokens are generated when processing reaches PG1, one for each path. When A1 completes, its token is passed on along path 820 to PG2 808. However, when EG completes, because it is an exclusive (XOR) gateway, its token is passed to one of either PG2, along path 822, or A2 810, along path 824. When A2 or PG2 completes, its token is passed to end event 812 along path 826 or 828, respectively. Based on a static analysis of the business process shown in FIG. 8, the relationships between the gateways can be mapped. That is, for each gateway in the business process it can be determined how many tokens it is expecting and what the next gateway is in the business process.

Table 1 shows a mapping of the relationships between gateways in the business process shown in FIG. 3.

TABLE 1

Mapping of relationships between gateways in the business process shown in FIG. 8

| Gateway | Next Gateway | Number of Tokens Expected |
|---------|--------------|---------------------------|
| PG1     | EG and PG2   | 1                         |
| EG      | End          | 1                         |
| PG2     | End          | 2                         |
| End     | none         | 2                         |

The static analysis of the business process shown in FIG. 8, shows that PG1 is the start gateway for PG2, EG and End. End, although shown as an event, is implicitly treated as an inclusive gateway since it will receive at least one token from either EG or PG2. The next gateway from PG1 is EG and PG2; and the next gateway from both EG and PG2 is End. PG1 and EG each expect one token, while PG2 and End each expect two tokens.

In accordance with an embodiment, each gateway is associated with a counter to keep track of how many tokens are needed before it can execute. At runtime, these counters can be decremented when tokens can no longer be received. For example, PG2 requires two tokens to activate, but because one of those tokens is from an exclusive gateway (here, EG) it may not receive two tokens. If PG2 does not receive two tokens then it will not activate and, therefore, it will not send a token along path 828. As such, in accordance with an embodiment, when EG executes, if it takes path 824 to A2, the next inclusive or exclusive gateway downstream of PG2 will be determined and its counter decremented. In this example, the next inclusive gateway is End which, because it is an inclusive gateway, is expecting up to two tokens, one from A2 and one from PG2. By decrementing End's counter from two to one, End will only be expecting one token, which it can receive from A2. This prevents End from waiting for a token from PG2 that will never come, and potentially hanging the business process. Instead, as soon as End gets a token from A2, the process will end.

In accordance with an embodiment, static analysis can be used to determine the boundaries of a block, by identifying a start gateway and an end gateway. Additionally, whenever there are two incoming flows or two outgoing flows in a business process, an inclusive gateway can automatically be created. As noted above, static analysis can be used to store relationships between each gateway within a given block, so that it can be used to decrement counters directly whenever a gateway is processed. If a counter is zero for any gateway, the next gateway's counter can also be decremented, depending on what type of gateway it is. Inclusive or exclusive gateways can be decremented by one. However, for parallel gateways, which can require multiple tokens, the system can continue recursively determining subsequent gateways until an inclusive or exclusive gateway is found. Once the next inclusive or exclusive gateway is found, its counter will be decremented accordingly.

Pseudocode Examples

FIG. 9 shows a pseudocode listing of a method used to determine a number of flows required by a gateway, in accordance with an embodiment. As shown in listing 900, the method getNumberOfFlows receives a gateway identifier and returns the number of flows, i.e., tokens, required for that gateway to activate.

FIG. 10 shows a pseudocode listing of a method that decrements a counter, in accordance with an embodiment. As shown in listing 1000, the method decrementFlowCount, can decrement the counter of the next gateway based on type of gateway. The counter indicates the number of flows required for the gateway to activate. This method can be used when it has been determined that no token will be provided along a particular path of a business process.

As shown at 1002, the method can determine whether the gateway is a merging gateway. If the gateway is a merging gateway, that is, a gateway which receives multiple incoming flows and outputs one outgoing flow at the end of a gateway block, then there is no need to decrement, and the method will end. At 1004, the method can determine the next gateway in the business process. At 1006, the method can determine the number of flows required by the next gateway. Since this method is called when it is known that a token will not be sent down a particular path, there are at least two conditions where a subsequent next gateway will need to be determined and possibly decremented: if the next gateway is a parallel gateway or if the next gateway requires one flow. Parallel gateways require the a particular number of flows or tokens, if any are missing then it will not activate. Similarly, no matter what type of gateway is next, if it requires one token, then in this case it will not activate. As shown at 1008, if the next gateway is a parallel gateway (which, as noted above, requires multiple tokens) or if the number of flows required by the next gateway is one (which when decremented, will be zero and thus will not activate). If either condition is true then, as shown at 1008, the method will be called recursively to determine a subsequent next gateway until the condition at 1008 is false, i.e., the next gateway is not a parallel gateway and its number of flows is not one). As shown at 1010, if the next gateway is not a parallel gateway and its number of flows is not one, then its counter is decremented by one, and the method ends.

FIG. 11 shows a pseudocode listing of method for determining whether an activity or an exclusive gateway can activate, in accordance with an embodiment. As shown in listing 1100, the method checks with a token manager to determine whether an activity or an exclusive gateway can activate. Since activities and exclusive gateways only require one token to activate, this check determines whether a token has been received by the particular activity or exclusive gateway which is being checked on.

FIG. 12 shows a pseudocode listing of a method for determining whether an inclusive gateway or a parallel gateway can activate, in accordance with an embodiment. As shown in listing 1200, for inclusive and parallel gateways, the method can determine the number of tokens required, determine the number available, and then return true or false, depending on whether there are enough tokens available to activate the inclusive or parallel gateway. At 1202, a queue is created which includes parallel and/or inclusive gateways from a business process. At 1204, a map is populated with tokens, including the activation ID associated with each token. At 1206, the map is iterated and for each gateway it is determined whether there are sufficient tokens available to activate the gateway.

FIGS. 13, 14 and 15 show pseudocode listings of methods for different types of activities and gateways to generate tokens, in accordance with an embodiment. FIG. 13 shows a pseudocode listing of a method for activities other than gateways to generate tokens, in accordance with an embodiment. As shown in listing 1300, the method can determine an activation ID for the current activity and generate a token for the next activity using the activation ID.

FIG. 14 shows a pseudocode listing of a method for parallel gateways to generate tokens, in accordance with an embodiment. Parallel gateways can have multiple parallel outgoing paths which each require a token to be generated and passed along to activities on those paths. As shown in listing 1400, the method can determine whether the parallel gateway is a starting or end gateway and then generate tokens as needed. At 1402, it is determined whether the parallel gateway is a starting gateway. If it is, then a new activation ID is generated. At 1404, it is determined whether the parallel gateway is an end gateway and, if it is, the current activation ID does not need to be carried forward to new tokens. At 1406, for each outgoing flow, i.e., path, from this parallel gateway, the token manager is invoked to generate a new token.

FIG. 15 shows a pseudocode listing of a method for exclusive and inclusive gateways to generate tokens, in accordance with an embodiment. As shown in listing 1500, token generation for exclusive and inclusive gateways can be performed within an executeStatement method. Similarly to FIG. 14, in FIG. 15 at 1502, if the gateway is a start gateway then a new activation ID is generated; and at 1504 if the gateway is an end gateway, then no activation ID is carried forward for any subsequent tokens. At 1506, a token is generated for each outgoing flow, i.e., path, similar to the parallel gateway. However, because exclusive and inclusive gateways do no necessarily generate tokens for each outgoing flow, for any flows which are not taken the method calls the decrement flow count method, to decrement counters of gateways along the flow or flows not taken.

Static and Runtime Analyses of an Exemplary Business Process

Figure 16:
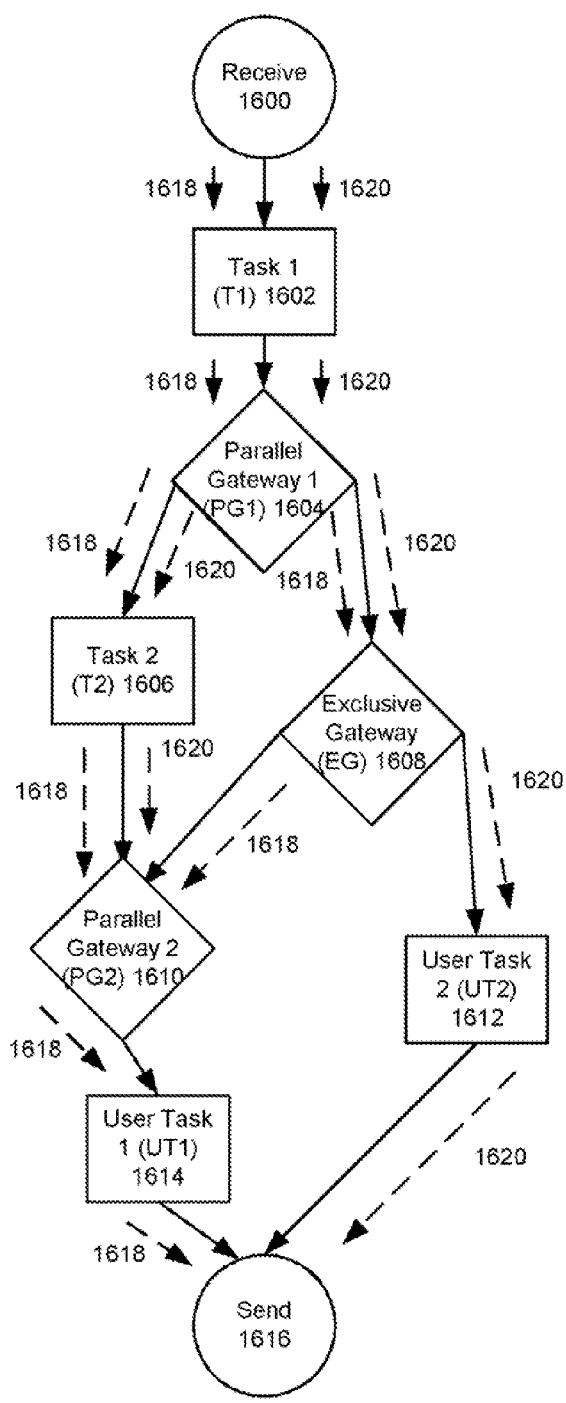
FIG. 16 shows an exemplary business process, in accordance with an embodiment.

FIG. 16 shows an exemplary business process, in accordance with an embodiment. The business process shown in FIG. 16 starts with a Receive event 1600, processing then proceeds to task 1 (T1) 1602 before reaching the first parallel gateway PG1 1604. As this is a parallel gateway, processing continues along both paths to task 2 (T2) 1606 and exclusive gateway (EG) 1608. Since EG is an exclusive gateway, processing continues to either PG2 1610 or user task 2 (UT2) 1612. PG2 also receives an incoming flow from T2. The outgoing flow from PG2 proceeds to UT1 1614 and this block of the business process terminates at event Send 1616. Static analysis of this example marks the PG1 gateway as the starting gateway for PG2, EG and Send. Send (which is an implicit inclusive gateway) is marked as the end, i.e., merging, gateway for PG1, EG and PG2. The next gateways from PG1 are EG and PG2; the next gateways from EG are PG2 and Send; and the next gateway from PG2 is Send. Based on static analysis PG2 needs two flows (tokens) to activate, EG needs one flow and send needs up to two flows.

In accordance with an embodiment, EG creates two separate paths that can be taken during execution of the business process. Processing will either continue along path 1618 or along 1620. These two paths are indicated in FIG.

16 by dashed arrows. As shown in FIG. 16, the two paths overlap until processing reaches EG, at which point the two paths diverge and only one can be taken. At runtime, where processing proceeds along path 1618, the following steps occur:

1. Receive executes and a token for PG1 is created (token [PG1,[ ]]).
2. When PG1 receives the token, it activates, since it only requires one token to activate. During activation, because PG1 is a starting gateway, an activation ID (100) will be generated, and two tokens, one for T2 [T2,(100)] and one for EG [EG,(100)], each indicating the activity name and activation ID, are generated. Additionally, because PG1 is a parallel gateway, no counters need to be decremented.
3. When T2 receives its token, it will execute and a token for PG2 will be generated using the same activation ID [PG2,(100)]
4. In this example it is assumed that when EG is processed, a token is generated and sent along path 1618 to PG2, using the same activation ID [PG2,(100)]. As this is an exclusive gateway, processing will not proceed along path 1620, and decrement flow counter is called. As described above, this will recursively traverse the business process until it finds an inclusive or exclusive gateway, whereupon it will decrement that gateway's counter. In this example, the next inclusive or exclusive gateway is Send (implicit). The counter for Send is then decremented to one from two and this information is stored in a scope associated with the process at runtime as Send-100=1.
5. At this point in runtime, PG2 has received tokens from T2 and EG2, meeting its required two tokens to activate. PG2 will activate and a token for UT1 [UT1,(100)] will be generated using the same activation ID.
6. UT1 can then activate and a token can be created and passed to Send [Send,(100)].
7. Send is an implicit inclusive gateway, and therefore needs at least one flow to activate. The flow along path 1620 will not come because EG the token from EG was sent along path 1618. Thus, send can check its scope to determine how many tokens it requires. Because its counter has been decremented to one, and it has received one token, it can activate, ending this block of the business process. Such processing can be expressed in pseudocode as:
int flows=scope.getFlows("Send-100");
if(tokens.size for 100==flows)
activates Send In accordance with an embodiment, processing can alternatively proceed along path 1620, to the exclusion of path 1618. At runtime, the following steps occur:

1-3. These steps proceed as described above with respect to path 1618.
4. When processing reaches EG, a token is generated for UT2 [UT2,(100)] and this token is sent to UT2 along path 1620. As this is an exclusive gateway, it will call the decrement flow counter method along path 1618.
5. In this case, the next gateway is PG2, a parallel gateway. Because PG2 requires two tokens, but will receive only one, it will not activate. Therefore, the method must identify the next inclusive or exclusive gateway following PG2. The next inclusive or exclusive gateway following PG2 is Send. The method will decrement Send's counter from two to one and store this information in its scope, as described above.
6. When UT2 is complete, a token can be created for Send using the same activation ID [Send,(100)].
7. Send can then activate upon receiving this token from UT2 since it is an implicit inclusive gateway and it is expecting one token. No token from path 1718 will be coming.

The present invention can be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for use in a messaging subsystem, which manages gateway flows, comprising:
a computer, including a microprocessor and a memory;
a business process stored in the memory as executable code and executed on the computer, wherein the business process includes:
a plurality of gateways; and
a plurality of counters stored in the memory, each associated with a different gateway;
wherein the system operates to:
statically analyze the business process to identify each of the plurality of gateways, generate a gateway map, and determine how many tokens are required for activating said each gateway;
populate each counter of the plurality of counters with an initial value representing how many tokens are required for activating an associated gateway as determined by statically analyzing the business process;
determine at runtime, based on an execution of the business process, that a subsequent gateway is to receive less tokens than the number of tokens required for activating the subsequent gateway;
identify the subsequent gateway in the gateway map through the steps of:

recursively traversing the gateway map, to identify a next-identified gateway;

determining whether the next-identified gateway is an inclusive or exclusive gateway to verify that the next-identified gateway corresponds, in the gateway map, to the subsequent gateway;

if the next-identified gateway is not an inclusive or exclusive gateway, repeating said traversing step and determining step until the next-identified gateway is determined to be an inclusive or exclusive gateway;

decrementing the counter associated with the next-identified gateway determined to be an inclusive or exclusive gateway to thereby reduce a number of tokens required for activating the next-identified gateway;

wherein decrementing the counter associated with the next-identified gateway configures the next-identified gateway to be activated with less tokens than said initial value determined by statically analyzing the business process;

whereby the next-identified gateway is prevented from hanging the business process in response to said runtime determination based on an execution of the business process.

2. The system of claim 1, statically analyzing the business process to identify each of the plurality of gateways comprises:
   determining a start gateway and an end gateway in each gateway block; and
   determining, for each gateway, a next gateway in the business process.

3. The system of claim 1, wherein the plurality of gateways include parallel, exclusive and inclusive gateways.

4. The system of claim 1, wherein decrementing the number of tokens required for activating a subsequent gateway comprises:
   determining that the gateway is an exclusive gateway, wherein the exclusive gateway has a plurality of outgoing paths;
   generating a token for an activity along one of the plurality of outgoing paths; and
   calling a decrement counter method for each of the plurality of paths not taken.

5. A method for use in a messaging subsystem operating on a computer comprising a microprocessor and a memory, which manages gateway flows, the method comprising:
   statically analyzing a business process stored on the computer as executable code, wherein the business process includes a plurality of gateways, and a plurality of counters stored in the memory, each of the plurality of counters associated with a different gateway, and wherein the static analysis includes the steps of identifying each of the plurality of gateways, generating a gateway map, and determining how many tokens are required for activating said each gateway;
   populating each counter of the plurality of counters with an initial value representing how many tokens are required for activating an associated gateway as determined by the static analysis of the business process;
   executing the business process on the computer;
   determining at runtime, based on the execution of the business process on the computer, that a subsequent gateway is to receive less tokens than the number of tokens required for activating the subsequent gateway;
   identifying the subsequent gateway in the gateway map through the steps of:
      recursively traversing the gateway map to identify a next-identified gateway;
      determining whether the next-identified gateway is an inclusive or exclusive gateway to verify that the next-identified gateway corresponds, in the gateway map, to the subsequent gateway;
      if the next-identified gateway is not an inclusive or exclusive gateway, repeating said traversing step and determining step until the next-identified gateway is determined to be an inclusive or exclusive gateway;
      decrementing the counter associated with the next-identified gateway determined to be an inclusive or exclusive gateway to thereby reduce a number of tokens required for activating the next-identified gateway;
      wherein decrementinq the counter associated with the next-identified gateway configures the next-identified gateway to be activated with less tokens than said initial value determined by statically analyzing the business process;
      whereby the next-identified gateway is prevented from hanging the business process in response to said runtime determination based on an execution of the business process.

6. The method of claim 5, statically analyzing the business process to identify each of the plurality of gateways comprises:
   determining a start gateway and an end gateway in each gateway block; and
   determining, for each gateway, a next gateway in the business process.

7. The method of claim 5, wherein the plurality of gateways include parallel, exclusive and inclusive gateways.

8. The method of claim 5, wherein decrementing the number of tokens required for activating a subsequent gateway comprises:
   determining that the gateway is an exclusive gateway, wherein the exclusive gateway has a plurality of outgoing paths;
   generating a token for an activity along one of the plurality of outgoing paths; and
   calling a decrement counter method for each of the plurality of paths not taken.

9. A non-transitory computer readable storage medium including instructions stored thereon which, when executed by a computer, cause the computer to perform the steps comprising:
   statically analyzing a business process stored on the computer as executable code, wherein the business process includes a plurality of gateways, and a plurality of counters stored in the memory, each of the plurality of counters associated with a different gateway, and wherein the static analysis includes the steps of identifying each of the plurality of gateways, generating a gateway map, and determining how many tokens are required for activating said each gateway;
   populating each counter of the plurality of counters with an initial value representing how many tokens are required for activating an associated gateway as determined by the static analysis of the business process;
   executing the business process on the computer;
   determining at runtime, based on the execution of the business process on the computer, that a subsequent gateway is to receive less tokens than the number of tokens required for activating the subsequent gateway;
   identifying the subsequent gateway in the gateway map through the steps of:

recursively traversing the gateway map to identify a next-identified gateway;

determining whether the next-identified gateway is an inclusive or exclusive gateway to verify that the next-identified gateway corresponds, in the gateway map, to the subsequent gateway;

if the next-identified gateway is not an inclusive or exclusive gateway, repeating said traversing step and determining step until the next-identified gateway is determined to be an inclusive or exclusive gateway;

decrementing the counter associated with the next-identified gateway determined to be an inclusive or exclusive gateway to thereby reduce a number of tokens required for activating the next-identified gateway;

wherein decrementinq the counter associated with the next-identified gateway configures the next-identified gateway to be activated with less tokens than said initial value determined by statically analyzing the business process;

whereby the next-identified gateway is prevented from hanging the business process in response to said runtime determination based on an execution of the business process.

10. The non-transitory computer readable storage medium of claim 9, statically analyzing the business process to identify each of the plurality of gateways comprises:

determining a start gateway and an end gateway in each gateway block; and determining, for each gateway, a next gateway in the business process.

11. The non-transitory computer readable storage medium of claim 9, wherein the plurality of gateways include parallel, exclusive and inclusive gateways.

12. The non-transitory computer readable storage medium of claim 9, wherein determining, at runtime, for each gateway whether to decrement the number of tokens required for activating a subsequent gateway comprises:

determining that the gateway is an exclusive gateway, wherein the exclusive gateway has a plurality of outgoing paths;

generating a token for an activity along one of the plurality of outgoing paths; and calling a decrement counter method for each of the plurality of paths not taken.

13. The system of claim 1, wherein the gateway counters are populated initially based on requirements determined during the static analysis.

14. The system of claim 1, wherein the gateway map embodies relationships between the gateways in each gateway block and is constructed based on gateway information determined during the static analysis.

15. The method of claim 5, wherein the gateway counters are populated initially based on requirements determined during the static analysis.

16. The method of claim 5, wherein the gateway map embodies relationships between the gateways in each gateway block and is constructed based on gateway information determined during the static analysis.

17. The non-transitory computer readable storage medium of claim 9, wherein the gateway counters are populated initially based on requirements determined during the static analysis.

18. The non-transitory computer readable storage medium of claim 9, wherein the gateway map embodies relationships between the gateways in each gateway block and is constructed based on gateway information determined during the static analysis.

* * * * *

UNITED STATES PATENT AND TRADEMARK OFFICE
CERTIFICATE OF CORRECTION

PATENT NO. : 9,652,292 B2  
APPLICATION NO. : 13/197660  
DATED : May 16, 2017  
INVENTOR(S) : Kuntawar Page 1 of 1

It is certified that error appears in the above-identified patent and that said Letters Patent is hereby corrected as shown below:

In the Specification

In Column 7, Line 34, delete "the a" and insert -- a --, therefor.

In Column 8, Line 39, delete "no" and insert -- not --, therefor.

In the Claims

In Column 12, Line 16, in Claim 5, delete "decrementinq" and insert -- decrementing --, therefor.

In Column 13, Line 17, in Claim 9, delete "decrementinq" and insert -- decrementing --, therefor.

Signed and Sealed this  
Thirty-first Day of October, 2017

Joseph Matal  
*Performing the Functions and Duties of the*  
*Under Secretary of Commerce for Intellectual Property and*  
*Director of the United States Patent and Trademark Office*